United States Patent [19]
Mahany

[11] Patent Number: 5,880,868
[45] Date of Patent: Mar. 9, 1999

[54] INFRARED BACKBONE COMMUNICATION NETWORK HAVING A RADIO FREQUENCY BACKUP CHANNEL

[75] Inventor: Ronald L. Mahany, Cedar Rapids, Iowa

[73] Assignee: Intermec IP Corp., Beverly Hills, Calif.

[21] Appl. No.: 929,593

[22] Filed: Sep. 15, 1997

Related U.S. Application Data

[63] Continuation of Ser. No. 415,063, Mar. 29, 1995, abandoned.

[51] Int. Cl.$^6$ .................................................. H04B 10/00
[52] U.S. Cl. .......................... 359/152; 359/145; 359/175; 370/310; 455/73
[58] Field of Search ................................... 359/143, 145, 359/146, 172, 152, 167; 455/73–74, 90; 370/310

[56] References Cited

U.S. PATENT DOCUMENTS

| | | | |
|---|---|---|---|
| 4,959,874 | 9/1990 | Saruta et al. ............................ | 359/172 |
| 5,301,353 | 4/1994 | Borras et al. ........................... | 359/145 |
| 5,424,859 | 6/1995 | Uehara et al. .......................... | 359/152 |

FOREIGN PATENT DOCUMENTS

| | | | |
|---|---|---|---|
| 0085933 | 4/1991 | Japan ..................................... | 359/167 |

*Primary Examiner*—Kinfe-Michael Negash
*Attorney, Agent, or Firm*—Akin, Gump, Strauss, Hauer & Feld, L.L.P.

[57] ABSTRACT

A communication network which uses an infrared backbone and having a radio frequency backup channel is disclosed. The infrared backbone is generally located on a ceiling in a hallway of a building and comprises a plurality of hub access points. The hub access points communicate data on the backbone in a relay fashion using modulated infrared light. If infrared communications fail, the hub access points may, as a backup, communicate in the same fashion using low power radio frequency (RF) transmissions. Each of the hub access points also communicate with one or more non-backbone tap access points using infrared or RF transmissions. Tap access points are generally located on the ceiling in the hallway near an adjacent room and/or at some location in the adjacent room itself. A tap access point in the hallway is hard-wired through the ceiling to another tap access point or an antenna in the room, which permits communication with an end-point device in the room using infrared or RF transmissions. Again, RF may be used as a backup to infrared. The access points use a sequential polling protocol and relay data throughout the network. Absorptive triangular shaped panels are used to absorb and deflect infrared transmissions.

4 Claims, 11 Drawing Sheets

INFRARED BACKBONE COMMUNICATION NETWORK HAVING A RADIO FREQUENCY BACKUP CHANNEL

CROSS-REFERENCE TO RELATED APPLICATION

The present application is a continuation of U.S. application Ser. No. 08/415,063, filed Mar. 29, 1995 by Ronald L. Mahany, now abandoned.

BACKGROUND OF THE INVENTION

The present invention relates generally to a communication network used to maintain communication exchanges within an enclosed premises; and, more particularly, it relates to a method and apparatus for maintaining communication exchanges utilizing both infrared and radio frequency transmissions in a premises such as an office building, hospital, factory floor, or the like.

As is well known, radio frequency (RF) transmissions have been used to maintain point to point communication. However, use of RF transmissions in a premises can cause several problems. For example, RF transmissions can interfere with the proper functioning of other equipment in the premises. Such interference is particularly undesirable in a premises such as a hospital, where the equipment may provide life support to patients. Further, because the Federal Communication Commission (FCC) has allocated only certain frequencies to premises RF-communication networks, interference may also occur between adjacent premises. Thus, RF communication in a premises may be hindered by RF noise from surrounding premises. Such noise may become a significant burden to communication in a premises located in a crowded, city environment.

These interference problems may also be enhanced given the physical layout of most premises. Specifically, a typical premises comprises structural supports and walls which limit the penetration of RF transmission. If the transmission power is too low, certain areas may arise wherein RF transmissions cannot be received (i.e., "dead zones"). While increasing the RF transmission power may increase penetration and eliminate dead zones, it also increases the likelihood that the above-described interference problems may occur.

In addition, increasing the RF transmission power may also be undesirable for health reasons. Specifically, it has been alleged that RF transmissions may potentially cause damage to human tissue or cells, and thus may be carcinogenic. As a result, it may be desirable to not only limit the RF transmission power in a premises, but also limit the use of RF transmissions altogether.

As is also well known, modulated infrared light has also been used to maintain point to point communication. Use of infrared light as such in a premises is a desirable alternative to RF transmissions because infrared light is rather harmless to humans and does not cause the interference problems discussed above. However, use of infrared light for communication in a premises causes a unique set of problems. For example, infrared communication is limited in range because it is directional, i.e., it requires "line of sight" type transmissions. As a result, it is difficult to provide communication over an entire premises using only infrared transmissions. In addition, dead zones are created easily in infrared systems by mere interruption of the light stream, resulting in a loss of data.

While infrared systems are less expensive than those using RF, they are not a viable alternative to RF because of these problems. Infrared communication has had virtually no market use in mobile environments, and has only been a solution to replacing RS232 and parallel wiring in short distance, line of sight environments such as between a personal computer and associated input and output devices (e.g., keyboard, mouse, printer, etc.).

Hence, it would be highly desirable to solve the foregoing variety of enumerated problems while maintaining reliable communication exchanges between a plurality of devices operating within an enclosed premises. It is therefore an object of the present invention to provide a method and apparatus which minimizes the need for RF communication while at the same time maximizes the benefits obtained from infrared communication.

It is another object of the present invention to provide a method and apparatus for maintaining communication in a mobile environment using both infrared and RF transmissions.

Other objects, advantages, and novel features of the present invention will become apparent from the following detailed description of the invention and claims with reference to the accompanying drawings.

SUMMARY OF THE INVENTION

These and other objects of the present invention are achieved in a backbone network used within a premises having at least two separate areas to maintain communication among endpoint devices. The network comprises a tap access point, located within the second area, having both an infrared transceiver and a radio frequency transceiver. The network further comprises an antenna, located in the first area, which is electrically connected to the radio frequency transceiver. The tap access point uses the infrared transceiver to communicate in the second area, and the radio frequency transceiver and antenna to communicate in the first area.

The network may also comprise a second antenna, located within the second area, which is electrically connected to the radio frequency transceiver for communicating using the radio frequency transceiver in the second area.

The network may further comprise at least one hub access point, located in the first or the second area, which communicates with the tap access point. Each hub access point has an infrared transceiver for establishing infrared communication and a radio transceiver for establishing radio frequency communication. At least one of a plurality of hub access points is communicatively coupled to the tap access point, and each of the plurality of hub access points selectively chooses between the infrared and radio frequency communication to maintain communication in the network. The hub access points may communicate via infrared whenever possible, and otherwise communicate via radio frequency, or vice versa, i.e., communicate via radio frequency whenever possible, and otherwise communicate via infrared.

In addition, the network may also comprise a panel which minimizes interference from unwanted infrared transmissions.

Other objects are also achieved in a communication network comprising a plurality of access points, each having an infrared transceiver to selectively establish a first communication channel and a radio frequency transceiver to selectively establish a second communication channel. The network further comprises a plurality of end-point devices configured for infrared or radio frequency communication or both. A communication protocol is used by each access point for directing the establishment of either the first communication channel or the second communication channel as needed to maintain communication with the end-point devices or other of the access points.

The communication protocol, when used for communication among a plurality of access points may first direct the establishment of the first communication channel and, if communication using that channel fails, direct the establishment of the second communication channel. Of course the network may also do the opposite, i.e., first direct the establishment of the second communication channel, if the second channel fails, then direct the establishment of the first communication channel. The communication protocol may comprise, for example, a polling protocol.

At least one of the access points may comprise a tap access point, which is located in a first area for communication using the first communication channel, and which is connected to an antenna located in a second area for communication using the second communication channel. The tap access point may also be connected to another antenna located in the first area for communication therein using the second communication channel.

DESCRIPTION OF THE PREFERRED EMBODIMENT

Figure 1:
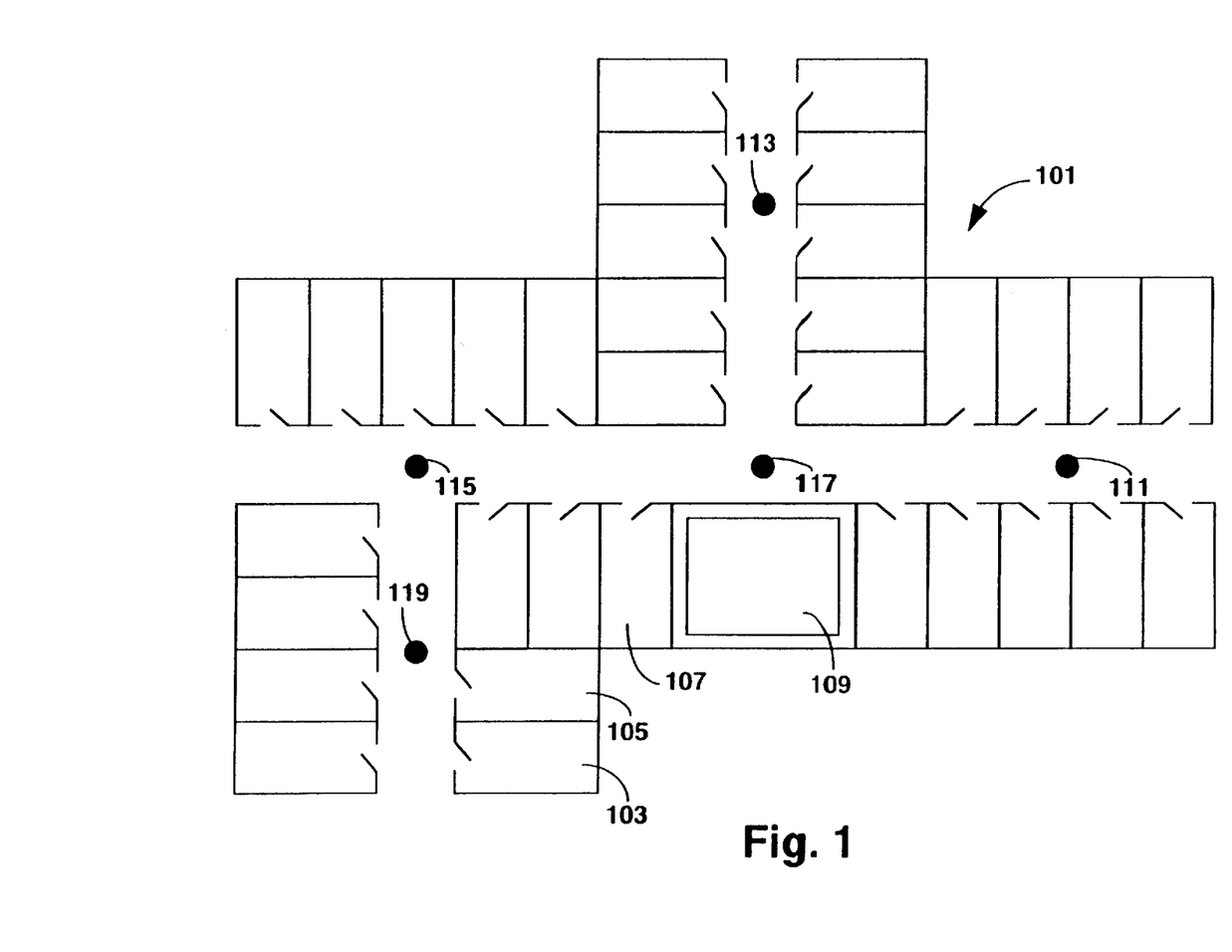
FIG. 1 illustrates an embodiment of the communication network of the present invention, representing communication throughout a floor of a hospital or office building.

FIG. 1 illustrates an embodiment of the communication network of the present invention, representing communication throughout a floor of a hospital or office building. In particular, a building 101 is configured with a communication network according to the present invention to provide communication between a plurality of devices (not shown) located in any of the rooms, such as rooms 103, 105, 107 and 109, in the building 101. Although in some embodiments, the room 109 may constitute a communication center, in other embodiments, the room 109 is no different than any other room. To support such communication, a backbone network is constructed from a plurality of hub access points 111, 113, 115, 117 and 119 which are built in accordance with the present invention.

FIGS. 2a–e illustrate several views and embodiments of access points according to the present inventions which are capable of maintaining both radio frequency and infrared transmission and reception. These access points may be used in the communication network, for example as illustrated in FIG. 1, (i) solely for infrared communication, (ii) solely for radio frequency communication, or (iii) for both radio frequency and infrared communication.

Figure 2A:
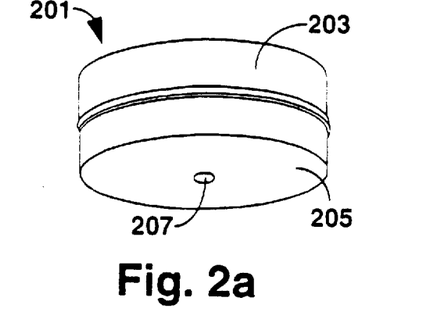
FIGS. 2a–e illustrate several perspective views and embodiments of access points according to the present inventions which are capable of providing both radio frequency and infrared transmission and reception.
Figure 2B:
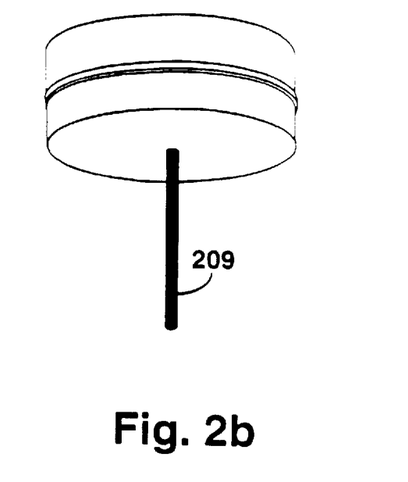

Specifically, in FIG. 2a, an access point consists of a main module 203 and a cap 205. The main module 203 contains all access point circuitry (see the description associated with FIG. 9 below), while the cap 205 constitutes a cover which is transparent to infrared transmissions. In an alternate embodiment, the cap 205 also diffuses infrared transmissions. The cap 205 contains a hole 207 for receiving an antenna 209, if needed, as shown in FIG. 2b.

Figure 2C:
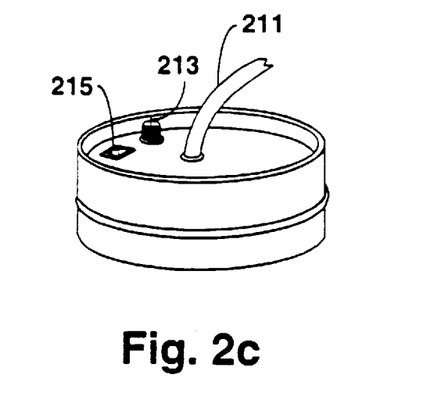

FIG. 2c is a perspective view of the access point 201 for illustrating the location and existence of a power cord 211, a coaxial connector 213 and a telephone jack 215. The coaxial connector 213 may be used to establish an alternate antenna configuration as detailed below in reference to FIGS. 4c and 4d. The telephone jack 215 is also provided for maintaining wired communication between access points (see the description associated with FIG. 3 below). Although the power cord 211 supplies AC (Alternating Current) power to the access point 201, in another embodiment, the access point 201 utilizes a battery power supply.

Figure 2D:
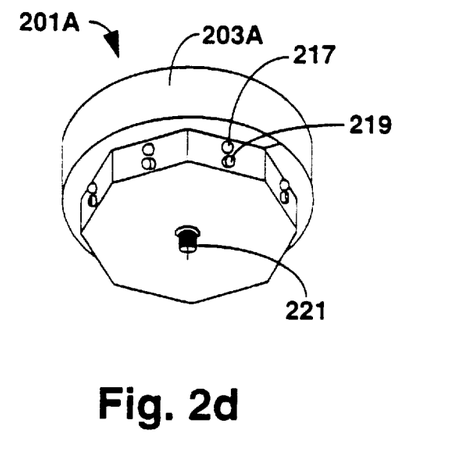
Figure 2E:
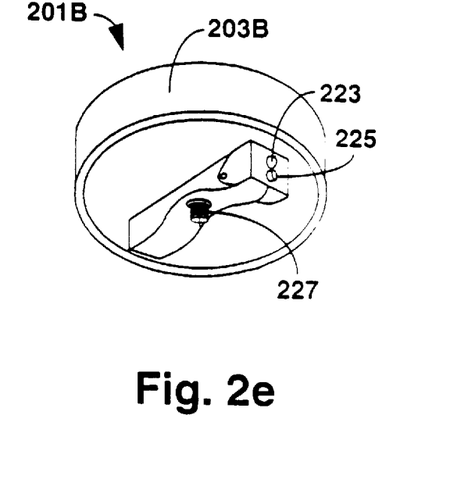

FIGS. 2d and 2e illustrate two versions of the access point 201 with the cap 205 removed. In particular, in FIG. 2d, a main module 203A of a hub access point 201A contains a plurality of infrared transmitter and receiver pairs, such as a laser diode 217 and a photo-transistor 219. Although other designs are contemplated, the laser diodes, such as the laser diode 217, are fitted with lenses and apertures so as to provide a infrared light throughout a forty five (45) degree angle of emission. Thus, to cover the entire three hundred and sixty (360) degrees, eight (8) laser diodes are needed (with a five degree overlap between each diode). In addition, a coaxial connector 221 provides for the connection of an antenna, such as the antenna 209 (FIG. 2b), when needed.

In FIG. 2e, a main module 203B of a tap access point 201B is shown. Instead of providing for infrared communication in all directions, such as is the case with the hub access point 201A (FIG. 2d), the tap access point 201B provides for communication from a single infrared transmitter and receiver pair, i.e., a laser diode 223 and a photo-transistor 225. As with the hub access point 201A, the tap access point 201B also has a coaxial connector, a coaxial connector 227, which provides for the connection of the antenna 209 when needed.

Figure 3:
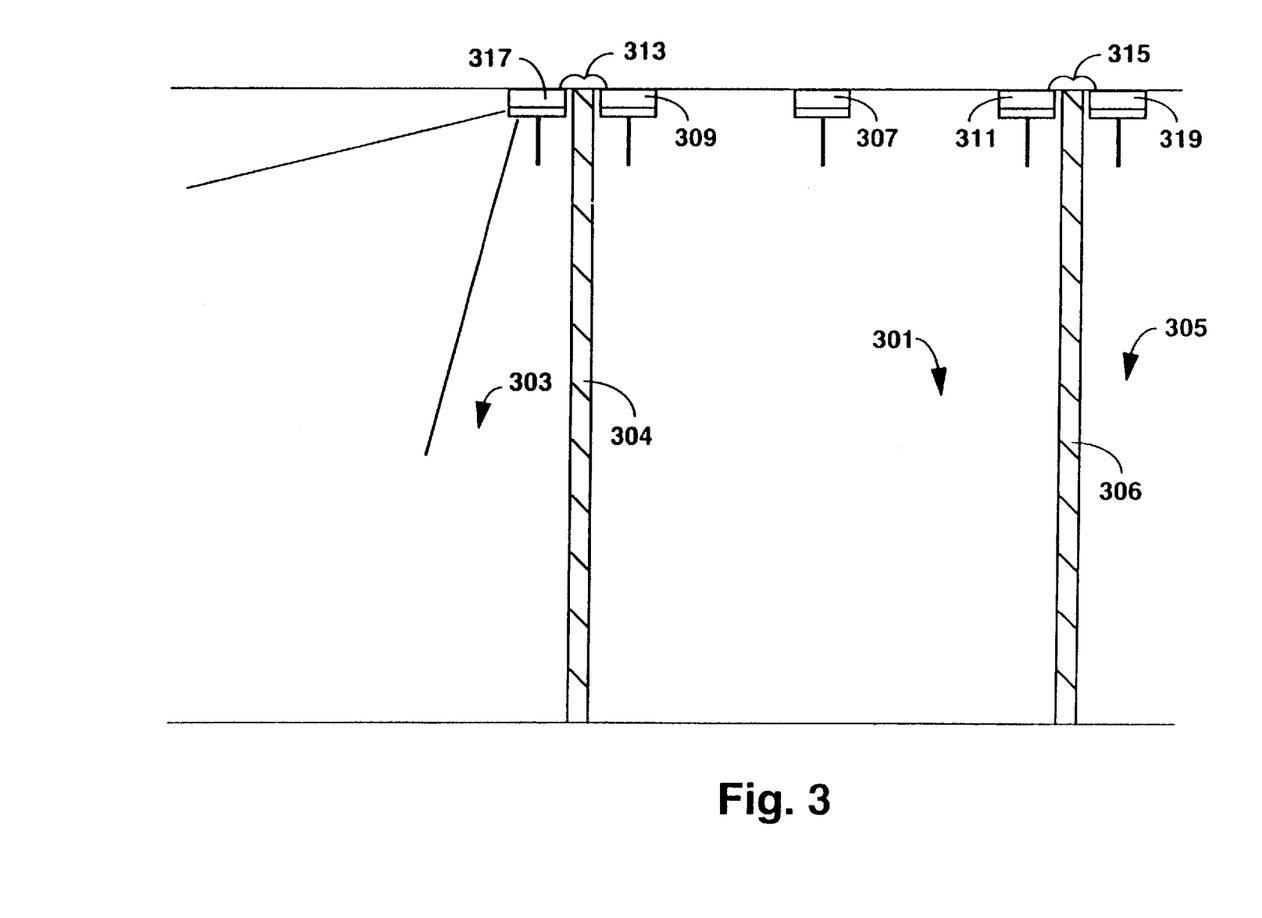
FIG. 3 is a cross sectional view illustrating a portion of a communication network according to one embodiment of the present invention, wherein the access points of FIGS. 2a–e are implemented.

FIG. 3 illustrates one embodiment of the present invention which illustrates a portion of a communication network utilizing the access points of FIGS. 2a–e. Specifically, FIG. 3 illustrates a cross sectional view of a building, such as the building shown in FIG. 1. The cross section illustrates a hallway 301 which separates offices or rooms, such as a room 303 and a room 305. Communication along the hallway 301 is maintained by a backbone network established by hub access points. A hub access point 307, installed on a ceiling, constitutes one member of the backbone network. Other hub access points (not shown) are placed on the ceiling along the hallways of the building so that each hub access point can communicate with at least one other hub via a line of sight infrared link. Of course, the hub access points may also be configured to communicate on the backbone network via wired links through the telephone jacks 215 discussed above in reference to FIG. 2C. An exemplary positioning of hub access points is shown in FIG. 1.

Each hub access point receives communication from other hub access points in a relaying fashion. For example, referring to FIG. 1, the hub access point 119 engages in communication exchanges with the hub access point 117 via the hub access point 115, providing a relaying pathway. Hub access points also communicate with tap access points which are used to direct communication into rooms or offices in a building. Specifically, referring back to FIG. 3, the hub access point 307 communicates with tap access point 309 and 311. In the illustrated embodiment, the tap access points 309 and 311 receive communications via line of sight, infrared links with the hub 307, and relay such communications via wired link 313 and 315, respectively. If the infrared link fails, the hub access point 307 and the tap access points 309 and 311 will utilize a low-power RF communication link to maintain communication (see the discussion relating to FIG. 9 for further detail).

Tap access points 317 and 319 receive relayed communications from the tap access points 309 and 311, respectively, and further relay the communications to end-point devices (not shown). The tap access points 317 and 319 attempt to maintain infrared communication to the end-point devices. However, if infrared communication becomes impossibly blocked, the tap access points 317 and 319 switch to low-power RF to maintain the communication link. In particular, each communication is first attempted using an infrared link. If the infrared link fails, the low-power RF link will be used. More detail regarding this process is illustrated in reference to FIG. 9 below. As can be appreciated, using infrared links whenever possible, RF transmission is minimized. Moreover, the RF transmissions that may occasionally occur are very low power, having only to span short, line of sight distances to destination (end-point) devices.

Although the illustrated configuration locates the tap access points 317 and 319 on the ceilings of the rooms 303 and 305 and by walls 304 and 306, respectively, the wired links 313 and 315 could be extended to locate the tap access points into the centers of the room or on any wall or table. Moreover, the tap access points 317 and 319 might also communicate with other access points located in the rooms 303 and 305. In fact, if the need arises, the tap access points 317 and 319 can be replaced with hub access points to extend the backbone network through wall barriers.

Figure 4A:
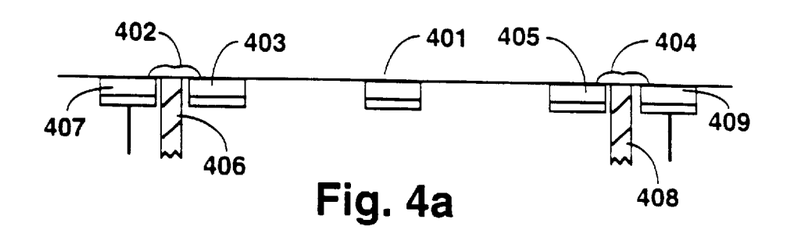
FIGS. 4a–d are cross sectional views which illustrate several other possible network configurations of the present invention using the access points of FIGS. 2a–e.

FIGS. 4a–d illustrate several other possible network configurations of the present invention using the access points of FIGS. 2a–e. In FIG. 4a, a hub access point 401 located on the ceiling of a hallway uses only an infrared link to communicate with tap access points 403 and 405. This configuration has cost advantages over that illustrated in FIG. 3 because the access points 403, 405 and 401 need not be fitted with radio transceivers or antennas, yet has the disadvantage of not having a backup RF link. However, because of the location of the access points on the ceiling of the hallway 301, physical blocking of the infrared communications is minimized.

The tap access points 403 and 405 also utilize wired links 402 and 404 to communicate to tap access points 407 and 409, respectively, which are located in an enclosed office or room in the building. The wired links 402 and 404 constitute a telephone type cord which plugs into telephone jacks of the access points, and permit communication through walls 406 and 408, respectively. The tap access points 407 and 409 utilize infrared links with end-point devices in the rooms (not shown) when possible, and low-power RF links for backup.

Figure 4B:
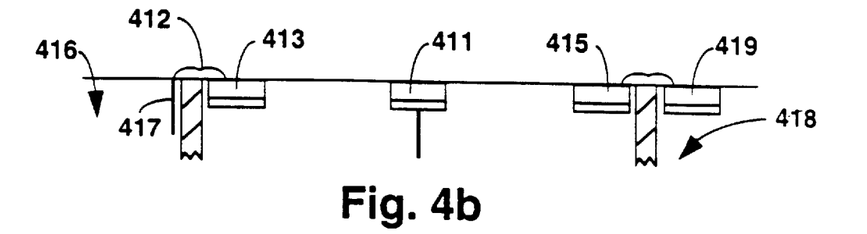

FIG. 4b illustrates two embodiments of the present invention. The first relates to a room 416 in which the use of low-power RF transmission are acceptable. The other relates to a room 418 where no RF transmission is acceptable. In both embodiments, a hub access point 411 uses infrared transmissions in the backbone network, while using RF transmissions only as a backup. However, the hub access point 411 could also be configured to use RF transmissions for the backbone network with infrared transmission only as a backup.

Regarding the room 416, a tap access point 413 communicates with the hub access point 411 using only infrared transmissions. However, the tap access point 413 uses low-power RF transmissions in the room 416. Instead of placing additional tap access points in the rooms, as is shown in FIG. 4a, a coaxial cable 412 permits the location of an antenna 417 in the room 416 for low-power RF communication with end-point devices. In this manner, the hub access point 411 is not forced to use a higher power RF transmission to cover the additional distances and to penetrate the wall of the room 416. Moreover, the walls of the room act to confine the low-power transmissions from the antenna 417 to the room.

In the room 418, infrared based communication with the hub access point 411 is established from end-point devices in the room 418 through tap access points 415 and 419. No RF communication is used. Thus, the tap access points 415 and 419 need not be fitted with RF transceivers or antennas.

Figure 4C:
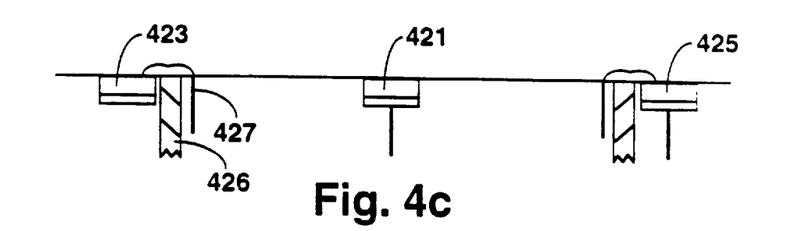

FIG. 4c illustrates an additional configuration of an infrared backbone network using RF transmissions for backup purposes. In this configuration, instead of using infrared, communication between a hub access point 421 and tap access points 423 and 425 occur solely through RF transmissions. Specifically, the tap access point 423 only communicates with end-point devices via infrared transmissions. The tap access point 423 communicates with the hub access point 421 via RF transmissions. Therefore, an antenna 427 is routed and placed outside of the room in the hallway. A wall 426 helps to contain the RF transmissions to the hallway.

The tap access point 425 also communicates with end-point devices via infrared transmissions, but also uses RF transmissions as a backup. However, as can be appreciated, the tap access point 425 must be capable of supporting RF communication in both the hallway (with the backbone network), and for backup in the room (with end-point devices). This requires that the tap access point 425 be configured with either two independent RF transceivers or a single dual-purpose RF transceiver.

Figure 4D:
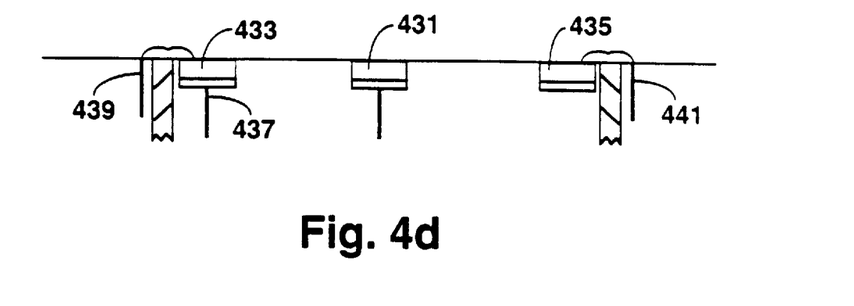

FIG. 4d illustrates yet other possible configurations of the present invention wherein the backbone network (comprising a plurality of hub access points including a hub access point 431) utilizes RF transmissions only as a backup to infrared communication. The hub access point 431 communicates with tap access points 433 and 435 using infrared transmissions. The tap access point 433 is fitted with an RF transceiver and an antenna 437 so that RF communication backup is available to the hub access point 431. In addition, the tap access point 433 also communicates using RF transmissions to end-point devices via an antenna 439. Thus, the tap access point 433 is fitted with a dual-purpose RF transceiver. The tap access point 435 and associated antenna 441 communicates as does the tap access point 413 in FIG. 4b as described above.

Figure 5:
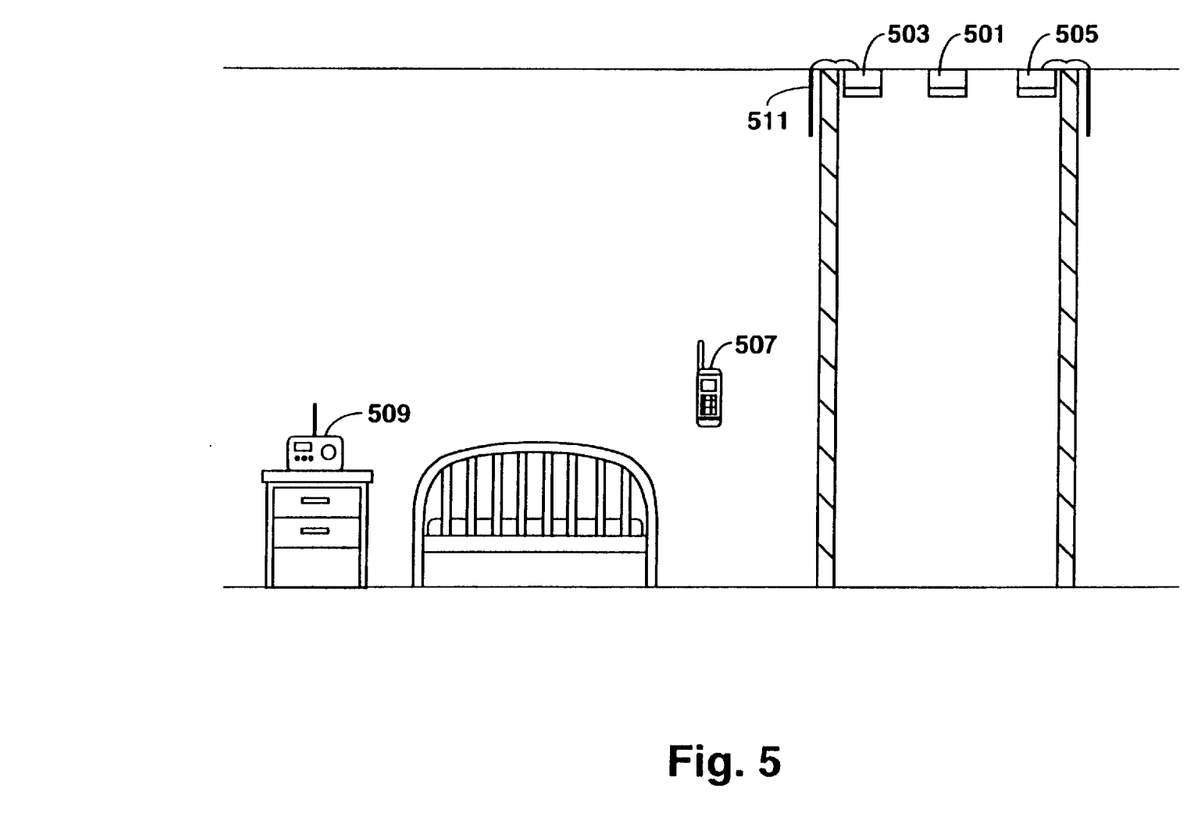
FIG. 5 provides a cross sectional illustration of another configuration of the present invention using the access points of FIGS. 2a–e in a hospital environment.

FIG. 5 more fully illustrates another configuration of the present invention using the access points of FIGS. 2a–e in a hospital environment. Infrared transmissions are used to maintain the backbone network including a plurality of hub access points, such as a hub access point 501. The hub access point 501 also utilizes infrared transmissions to communicate to tap access points 503 and 505. The end-point devices, such as a hand-held terminal 507 and monitoring station 509, thus communicate with the tap access point 503 (through its antenna 511) using RF transmissions. Because of the relatively small size of the room and the absence of substantial physical RF barriers such as separating walls, the RF transmission power required is very low. Such low levels are highly unlikely to harmfully affect any electronic equipment or patients in the room. Moreover, the walls of the room also help contain the low power transmissions so as to minimize interference with RF transmissions in the hallway or in adjacent rooms.

Figure 6:
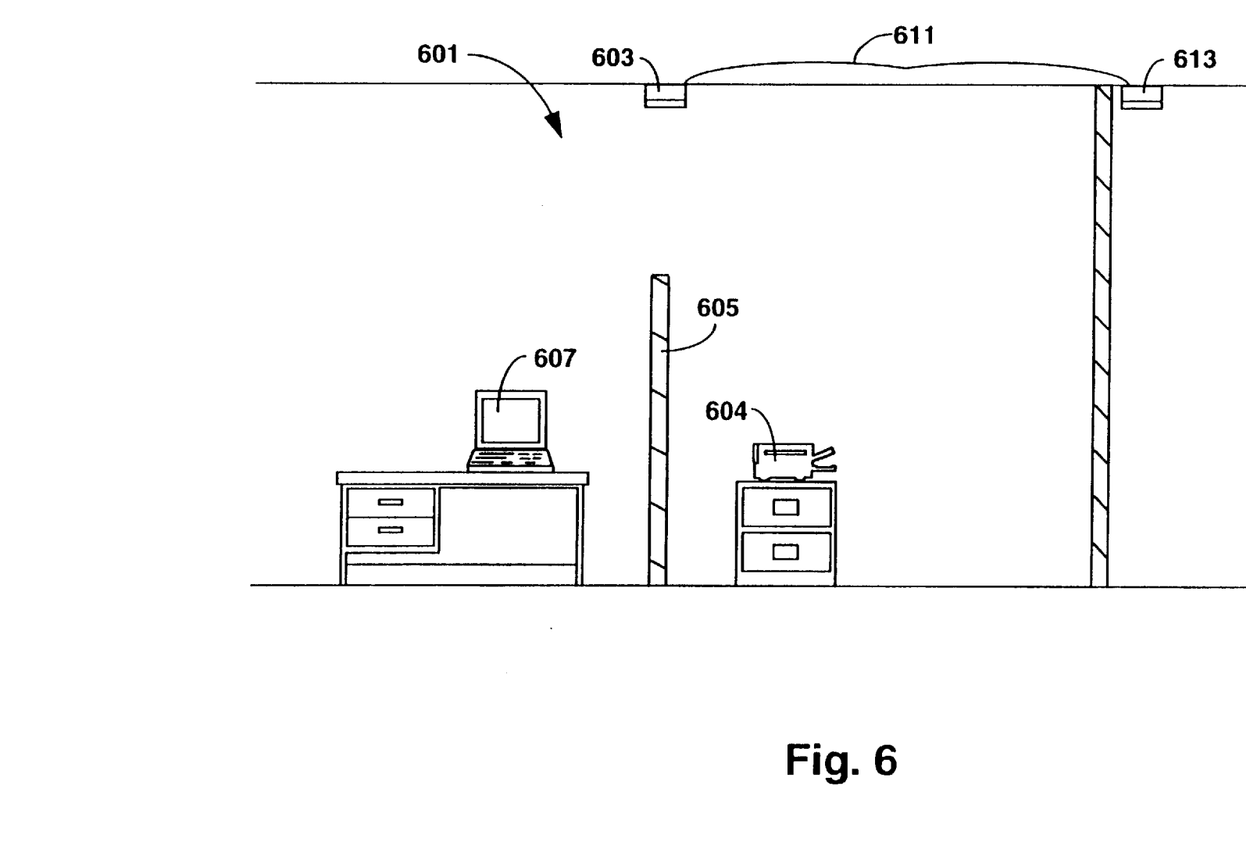
FIG. 6 provides another cross sectional illustration of a configuration of the present invention using the access points of FIGS. 2a–e in an office environment.

FIG. 6 illustrates another configuration of the present invention using the access points of FIGS. 2a–e in an office environment. In an office 601, a tap access point 603 is centrally located so that interference with physical barriers, such as a dividing wall 605, is minimized. In the central location, the tap access point 603 establishes line of sight, infrared communication with end-point devices fitted with infrared transceivers, such as a computer 607 and a printer 609. Also illustrated is a wired link 611 which interconnects the tap access point 603 in the office from a tap access point 613 in the hallway. Although the tap access point 613 illustrated does not use RF communication for backup, from the several examples given it is clear that it could.

Figure 7A:
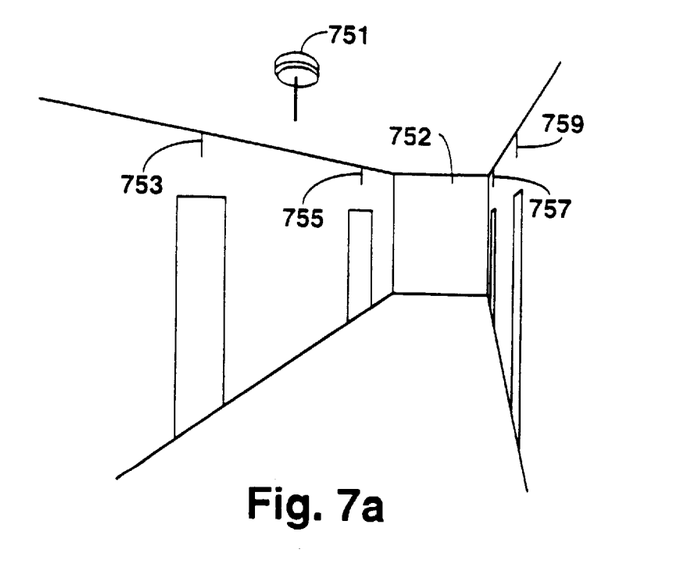
FIGS. 7a–b provide perspective views illustrating two different backbone network configurations built in the hallways of an exemplary building in accordance with the present invention, and, specifically, illustrate the communication exchange between specific rooms or offices and the backbone network.
Figure 7B:
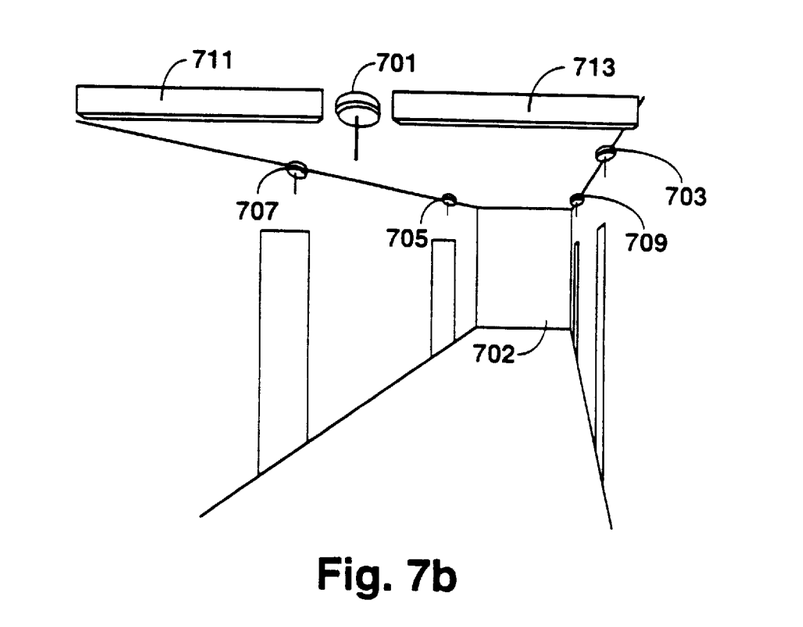

FIGS. 7a–b are perspective views which illustrate two different backbone network configurations built in the hallways of an exemplary building in accordance with the present invention, and, specifically, illustrate the communication exchange between specific rooms or offices and the backbone network. In FIG. 7a, a hub access point 751 participates with other hub access points to maintain a backbone network. In particular, the hub access point 751 participates by relaying communication to and from another hub access point (not shown) located within line of sight further "down" the hallway. For frame of reference, a wall 752 is located "up" the hallway. Backbone network communicates using infrared transmissions, while using RF transmissions for backup purposes when infrared transmissions fail. The hub access point 751 also establish RF communication through the antennas 753, 755, 757 and 759 to tap access points inside the rooms (as detailed in FIG. 4c).

Because of its location, the hub access point 751 participates as a polled device in the backbone network through another hub access point (the polling device) located down the hall. However, the hub access point 751 also participates as a polling device when communicating with the tap access points connected to the antennas 753, 755, 757 and 759. First, the hub access point 751 polls the tap access point associated with the antenna 753, and then polls the other tap access points in sequence. Thereafter, the hub access point 751 enters a "listening" state to detect infrared polling transmissions from a hub access point located down the hallway (not shown). After responding to a polling transmission if a response is necessary, the hub access point 751 repeats the cycle.

In FIG. 7b, a hub access point 701 forms a part of the backbone network by relaying communication to and from another hub access point (not shown) located within line of sight further down the hallway. A wall 702 is located up the hallway. The backbone network employs infrared transmissions as a default, while using RF transmissions as a backup. The hub access point 701 provides tap access points 703, 705, 707 and 709 access to the backbone network. Such access also utilizes infrared transmissions, while using RF transmission backup. Each of the tap access points 703, 705, 707 and 709 are connected to either other access points or other antennas located in the corresponding rooms (as detailed in the examples illustrated in FIGS. 3–6).

To minimize infrared interference, expandable panels 711 and 713 are installed on the ceiling adjacent to the hub access point 701. The panels 711 and 713 expand in the horizontal direction to cover the distance between the hub access point 701 and a wall of the hallway. The panels 711 and 713 block infrared transmissions so that transmissions originating on one side of the panels are blocked from reaching access points on the other side of the panels. The color of the panels 711 and 713, a light grey, minimizes the amount of infrared transmission reflection. In addition, the panels 711 and 713 are triangularly shaped so as to reflect infrared transmissions downward, out of the plane of the access points. The hub access point 701 participates on both sides of the panels 711 and 713. In this manner, the expandable panels 711 and 713 create infrared communication cells having minimal noise characteristics. Note that another expandable panel (not shown) could also be placed against and along the ceiling of the wall 702 to deflect downward transmissions from the hub access point 701. However, because infrared transmission reflections from the wall 702 originating from the hub access point 701 rarely encounter the phototransistors of tap access points 703, 705, 707 and 709, the additional panel is not necessary in this circumstance.

Figure 7C:
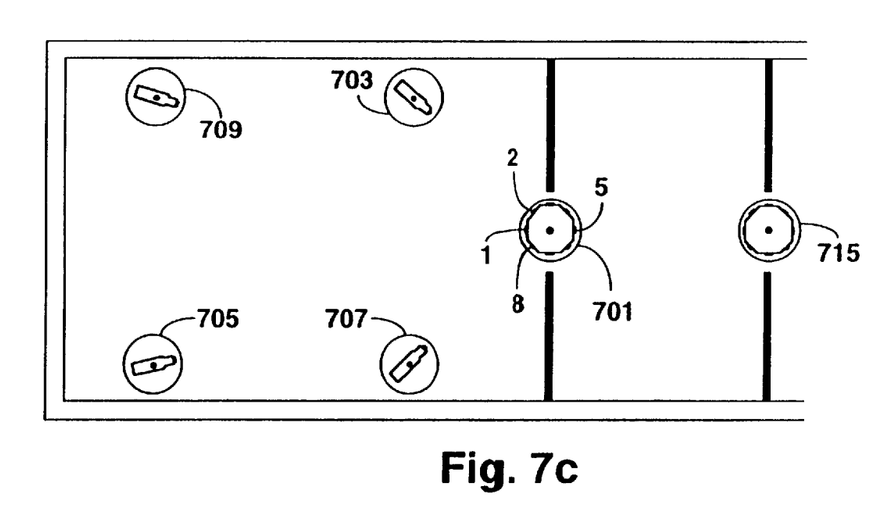
FIG. 7c is a cross sectional top view of the hallway of FIG. 7b illustrating the infrared diode layout in the access points of the present invention.

FIG. 7c is a cross sectional top view of the hallway of FIG. 7b illustrating the polling protocol and the infrared diode layout of the access points in one embodiment of the present invention. As discussed in more detail below in reference to FIG. 8, the hub access point 701 uses an exemplary polling protocol to manage communications. Because of the coverage constructs of the infrared laser diodes and the layout in the hallway, the hub need only use four of its eight pairs of infrared laser diodes and corresponding photo-transistors. In particular, upon receiving infrared communications from a hub access point 715 located down the hallway, the hub access point 701 identifies the phototransistor which provides the best reception. The laser diode which is paired with the identified phototransistor is selected and thereafter used to communicate with the backbone network. In this case, a laser diode number 5 would most likely be selected. Similarly, the hub access point 701 selects laser diodes based on received infrared transmissions for each of the tap access paints 703, 705, 707 and 709. The tap access points 703 and 707 would most likely be assigned laser diode number 2 and number 8, respectively. The tap access points 705 and 709 would likely be assigned the same laser diode, laser diode number 1.

The hub access point 701 controls communication by independently polling each of the tap access points 703, 705, 707 and 709 in succession. Such polling is conducted using the laser diodes selected for each tap access point. For example, the hub access point 701 first polls the tap access point 703 using the laser diode number 2. If no response is received, indicating that no communication is needed, or after a communication exchange has terminated, the hub access point 701 polls the tap access point 705 via the laser diode number 1. Afterwards, using the same laser diode number 1, the hub access point 701 polls the tap access point 709. Thereafter, the tap access point 707 is polled. To communicate with the backbone network, the hub access point 701 begins to listen for a polling message from other hub access points located down the hallway, the hub access point 715. When a polling message is detected, the hub access point 701 relays information to or from the backbone network as proves necessary. After such relaying has been completed (or after a predetermined time period), the hub access point 701 restarts the polling process by polling the tap access point 703. Further detail regarding this process is provided in reference to FIG. 8 below.

Figure 7D:
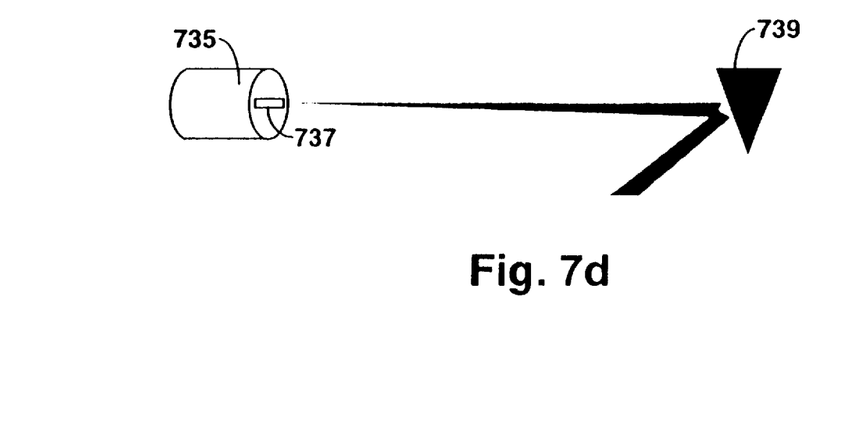
FIG. 7d provides a cross sectional view illustrating the interaction of an infrared transmission of a laser diode with a panel.

FIG. 7d provides a cross sectional view illustrating the interaction of an infrared transmission of a laser diode 735 with one embodiment of a panel. The laser diode 735 is fitted with a horizontally shaped aperture, an aperture 737. With the aperture 737, the laser diode 735 produces infrared light in a very thin vertical beam, yet with a forty five (45) degree spread horizontally.

A panel 739 is installed for at least two reasons. First, the panel 739 contains infrared transmissions on either side of the panel, each panel helping to create two autonomous infrared communication cells. Such containment proves highly beneficial in establishing higher throughput communication protocols, such as the exemplary protocol detailed herein.

Second, the panel 739 minimizes reflection of a beam from the laser diode 735 toward any phototransistor that might happen to be located in the reflection pathway. To minimize such reflection, the surface of the panel 739 is designed to absorb or deflect infrared beams. Specifically, the surface is black with a rough texture to maximize absorption, and is angled so as to deflect incoming beams downward, away from the plane of phototransistors. Although not illustrated, such panels or surfaces might also be placed along any wall to further minimize reflection. Moreover, the ceiling might also receive the black texture for similar reasons.

Figure 8:
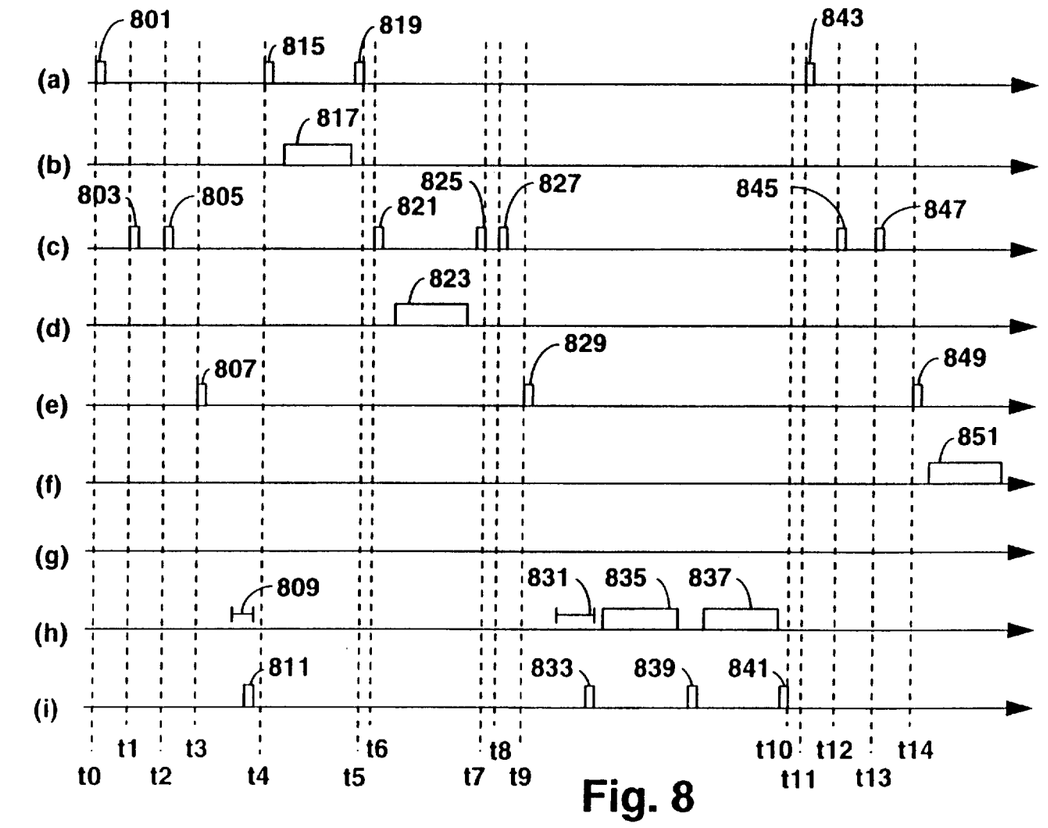
FIG. 8 is a timing diagram illustrating a polling protocol used to maintain communications through one embodiment of the communication network of the present invention.

FIG. 8 is a timing diagram illustrating, in more detail, the exemplary polling protocol used to maintain communications through the communication network set forth in FIG. 7b, and which is equally applicable to FIGS. 7a or 7b. Time lines (a)-(i) of FIG. 8 represent communication transmissions and receptions at a hub access point, such as the hub access point 701 (FIG. 7c). In particular, referring to FIGS. 7c and 8, the time line (a) represents the laser diode 2 engaging in polling transmissions from the hub access point 701 to the tap access point 703. The time line (b) represents transmissions received by the hub access point 701 from the tap access point 703 which are responsive to the polling transmissions of the time line (a). Similarly, the time line (c) represents the laser diode 1 engaging in polling transmissions to the tap access points 705 and 709, and their responses received by the hub access point 701 are represented by the time line (d). The time line (e) represents polling transmissions from the laser diode number 8 of the hub access point 701 to the tap access point 707, and responses received by the tap access point 707 is illustrated by the time line (f). The time line (g) represents the lack of activity on all non-utilized infrared transceiver pairs and the non-utilized RF transceiver. In the time line (h), the hub access point 701 is shown in a listening state, awaiting polling from other hub access points in the backbone network. Finally, the time line (i) represents the polling messages received from another hub access point in the backbone network.

More specifically, at a time t0 as illustrated on the time line (a), the hub access point 701 begins the communication cycle by transmitting a polling message 801 to the tap access point 703. Thereafter, as illustrated in the time line (b), the hub access point 701 listens for a response. If a response is not detected within a timeout period, the period ending at a time t1, the hub access point 701 sends another polling message, a polling message 803, to the tap access point 705 as illustrated by the time line (c). Again the hub access points awaits a response during a timeout period ending at a time t2. Since no response is received, as illustrated by the time line (d), the hub access point 701, transmits a polling message 805 to the tap access point 709. Again, no response is detected by the time out period ending at a time t3, as illustrated by the time line (d). Thereafter, the hub access point 701 transmits a polling message 807, and receives no response during the time out period as illustrated by the time lines (e) and (f). At this point, because there are no other tap access points to poll, the hub access point 701 enters a listening mode, awaiting polling messages from another hub access point located down the hallway, as illustrated by a time bracket 809 in the time line (h). Although the hub access point 701 has received no information to forward to the backbone network, the listening period is required to determine whether information from the backbone network is awaiting delivery through the hub access point 701. Upon receiving a polling message 811 on the time line (i), the hub access point 701 determines that no information from the backbone network is waiting. Thus, the entire cycle repeats itself.

Again, as illustrated in the time line (a), the hub access point 701 sends a polling message 815. However, before the time out period lapses, the tap access point 703 responds with a data message 817, as illustrated by the time line (b). Since the transmission was successfully received, the hub access point 701 transmits an acknowledge message 819, otherwise the data message would have to be resent. Although the data message 817 received is directed through the backbone network, had it been destined to another of the tap access points which the hub access point services, the existence of the data message 817 would be indicated in the subsequent polling message to that destination tap access point. Upon receiving the subsequent polling message, the hub access point 701 would then route the message to the destination tap access point. However, in this situation, the data message 817 is stored for routing through the backbone network. Thereafter, the hub access point 701 continues the polling process by transmitting a polling message 821 to the tap access point 705. The tap access point responds, as illustrated in the time line (d), by transmitting a data message 823. The hub access point 701 receives the data message 823 and responds with an acknowledge message 825. Again, because the data message 823 is destined for the communication through the backbone network, the hub access point 701 stores the message for future transfer. Thereafter, polling messages 827 and 829 are sequentially transmitted to the tap access points 709 and 707, and no response to either is received before the time out periods, as illustrated by the time lines (c) through (f). The hub access point 701 enters a dormant listening mode during a time bracket 831, see the time line (h), and detects a polling message 833 from the hub access point in the backbone network, see the time line (i). In response, the hub access point 701 forwards the stored messages 817 and 823 to the backbone network as data messages 835 and 837, respectively. The hub access point down the hallway provides acknowledge messages 839 and 841 if the data messages 835 and 837 are correctly received. Failed transmissions will be retried. After forwarding the data messages, the hub access point 701 then begins the polling process again, by transmitting polling messages 843, 845, 847 and 849. Lastly, in response to the polling message 849, a data message 851 is received by the hub access point 701 from the tap access point 707, and the process continues.

Figure 9:
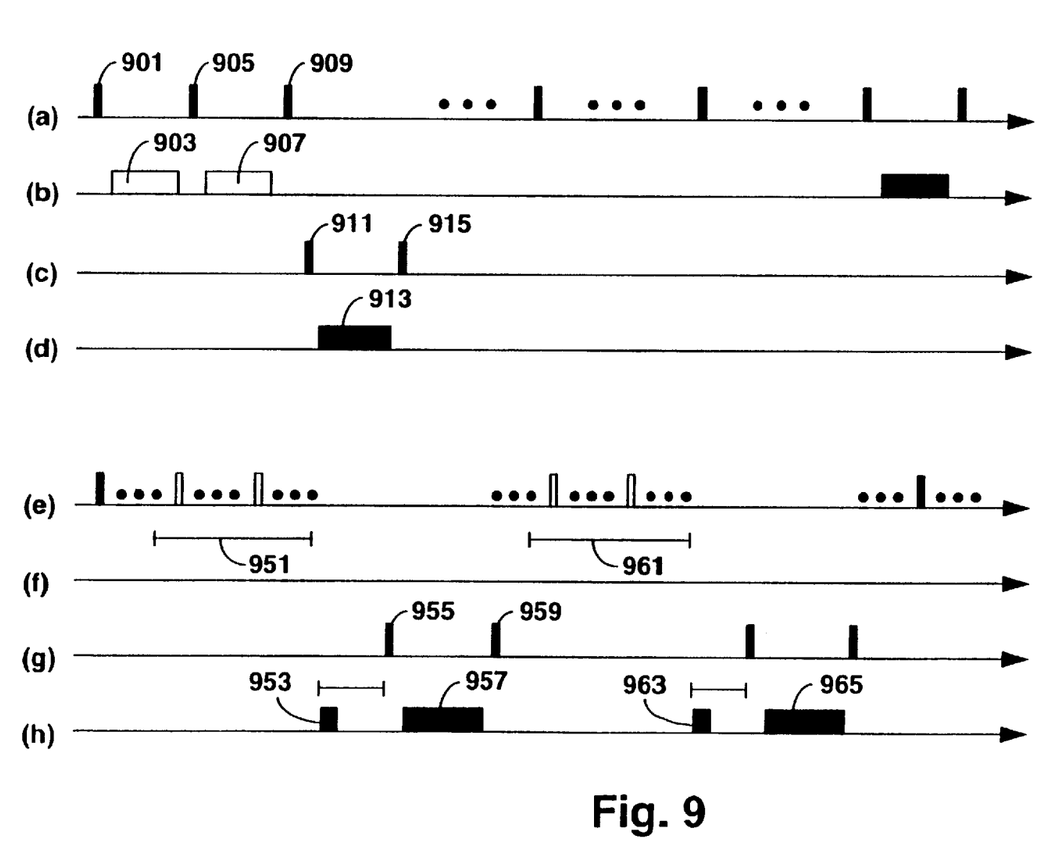
FIG. 9 is a timing diagram illustrating the adaptive nature of the polling protocol used in the selection of infrared and RF communication links.

FIG. 9 is a timing diagram illustrating the adaptive nature of the polling protocol used in the selection of infrared and RF links. Time lines (a) through (d) represent a communication exchange wherein infrared transmissions from the tap access point 709 are not successfully received by the hub access point 701, even though the tap access point 709 successfully receives infrared polling messages. The time line (a) illustrates transmissions by the hub access point using an infrared source. The time line (b) illustrates corresponding receipt of infrared transmissions from the tap access point 709 by the hub access point 701. The time line (c) represents RF transmissions from the hub access point 701, while the time line (d) represents RF transmissions received by the hub access point 701.

In particular, as illustrated in the time lines (a) and (b), the hub access point 701 transmits an infrared polling message 901. The tap access point 709 successfully receives the poll and transmits an infrared data message 903. However, the hub access point 701 does not receive the message 903 correctly. Therefore, instead of sending an acknowledge message, the hub access point 701 transmits an infrared resend message 905. Again, the tap access point 709 successfully receives the transmission and responds by resending the data as an infrared data message 907. Because the tap access point fails to properly receive the data a second time, an infrared resend message 909 is transmitted indicating that an RF transmission is justified. After a short delay, the hub access point 701 transmits an RF polling message 911. In response, the tap access point 709 resends the data as an RF data message 913. Finally, because the RF data message 913 is successfully received, the hub access point 701 sends an RF acknowledge message 915. Thereafter, both access points 701 and 709 return to the infrared communication link, and, as illustrated, resume normal polling and data message transfer. If the amount of interference causes the hub to utilize the RF link to often, the hub access point 701 signals for technical assistance through the backbone network.

Time lines (e) through (h) in FIG. 9 illustrate another RF backup scenario in which polling messages from the hub access point 701 are not received by the tap access point 709. The hub access point 701 continues along its polling cycle, assuming that the tap access point 709 is receiving its infrared polling messages. After missing a series of polling messages for a duration of time 951, the tap access point 709 decides that something is wrong. The tap access point 709 transmits a help message 953 and waits for the hub access point 701 to finish its current tasks and respond. As soon as the current task has been completed, the hub access point 701 sends an RF polling message 955. In response, the tap access point 709 sends an RF data message 957, which is acknowledged with an RF acknowledge message 959. Thereafter, the access points 701 and 709 resume the polling cycle on the infrared link. Again, after a duration of time 961, the tap access point 709 determines that it can't sense any infrared transmissions, and again transmits an RF help message 963. After an RF data message 965 is acknowledged, the infrared link is again restored. If the RF backup is required too often, technical assistance is again sent for along the backbone network. If the RF link is required all of the time, the RF link will become the polling default until the infrared link problem is fixed.

Moreover, although the protocol described in reference to FIG. 9 refers to an embodiment wherein infrared communication is used as the default while RF communication constitutes a backup channel, the opposite configuration might be used. Specifically, RF communication could be used as the default mode with infrared constituting a backup. In such an alternate embodiment, the description associated with FIG. 9 still applies so long as the infrared and RF roles are reversed. Therefore, a further description of this alternative need not be repeated. These protocols are carried out via software routines running within each of the access points in the network.

Figure 10:
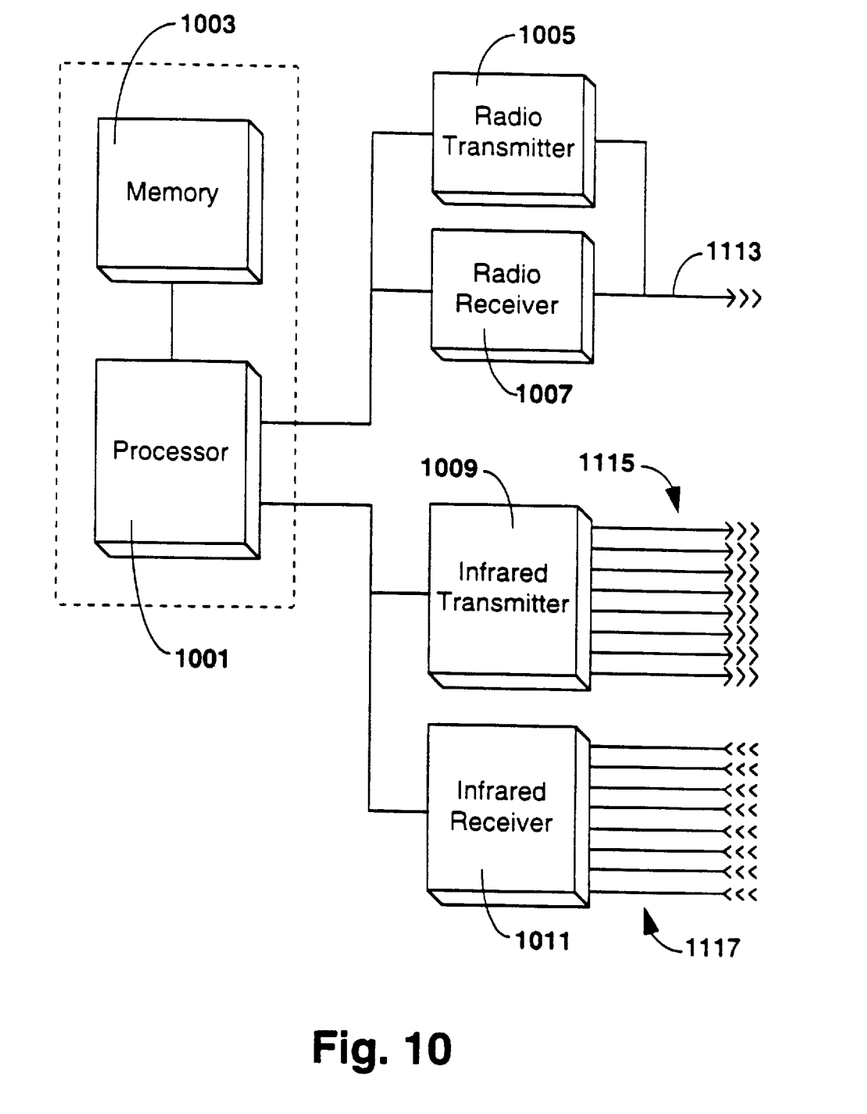
FIG. 10 is a block diagram representing the circuitry found in access points constructed in accordance with the present invention.

FIG. 10 is a block diagram representing the circuitry found in access points constructed in accordance with the present invention. As illustrated, a processing circuit 1001 is connected to memory 1003 in a conventional manner. The memory 1003 provides storage for (i) software programming that defines the operating procedures for the processing circuit 1001, (ii) data messages to be relayed, and (iii) communication parameters and other variables. Operating pursuant to the program stored in the memory 1003, the processing circuit 1001 controls an RF transmitter circuit 1005, an RF receiver circuit 1007, an infrared transmitter circuit 1009 and an infrared receiver circuit 1011 pursuant to the communication protocol described in relation to FIGS. 8 and 9.

The coaxial connectors shown in FIGS. 2c-e constitute the attachment points for antennas on an antenna bus 1113. The radio transmitter and receiver circuits 1005 and 1007 selectively utilize any antennas that may be attached to the antenna bus 1113. Such utilization occurs per the protocol stored in the memory 1003.

The laser diodes of the hub access point illustrated in FIG. 2d are attached to a drive bus 1115. The infrared transmitter circuit 1009 transmits by selectively applying digital data onto ones of the plurality of drive lines in the drive bus 1115. The applied digital data activates and deactivates (modulates) the corresponding ones of the laser diodes. In FIG. 2e, in the illustrated tap access point, only a single drive line of the drive bus 1115 is needed to support the single laser diode.

To receive infrared transmissions, the infrared receiver circuit 1011 provides a sensor bus 1117 which interconnects the circuit 1011 with the phototransistors shown in FIG. 2d. The infrared receiver circuit 1011 selects ones of the phototransistors via the sensor bus 1117 for monitoring after polling messages are transmitted (see the discussion relating to FIG. 8 above). For the tap access point of FIG. 2e, only a single sensor interconnect of the sensor bus 1117 is used.

It is obvious that the embodiments of the present invention described hereinabove are merely illustrative and that other modifications and adaptations may be made without departing from the scope of the appended claims.

I claim:

1. A communication network for use within a premises to maintain communication among a plurality of end-point devices, said network comprising:

a first tap access point device having an infrared transceiver and a radio frequency transceiver;

a second tap access point device having an infrared transceiver and a radio frequency transceiver;

a plurality of hub access point devices each having an infrared transceiver and a radio transceiver; and each of the plurality of hub access point devices using the infrared transceivers when possible and, otherwise, the radio frequency transceivers to provide a communication pathway between the first and second tap access point devices.

2. The communication network of claim 1, wherein each of the plurality of hub access point devices use respective radio frequency transceivers when communication via respective infrared transceivers is unavailable.

3. The communication network of claim 1, wherein each of the plurality of hub access point devices use respective radio frequency transceivers when communication via respective infrared transceivers is unsuccessful.

4. The communication network of claim 1, wherein each of the plurality of hub access point devices attempt communication via respective infrared transceivers prior to employing respective radio frequency transceivers.

* * * * *